June 21, 1966     T. B. CAMPBELL     3,256,566
CORRUGATING APPARATUS
Filed April 3, 1964     2 Sheets-Sheet 1

THOMAS BRUCE CAMPBELL
INVENTORS
BY Jacobi & Davidson
ATTORNEYS

June 21, 1966  T. B. CAMPBELL  3,256,566
CORRUGATING APPARATUS
Filed April 3, 1964  2 Sheets-Sheet 2
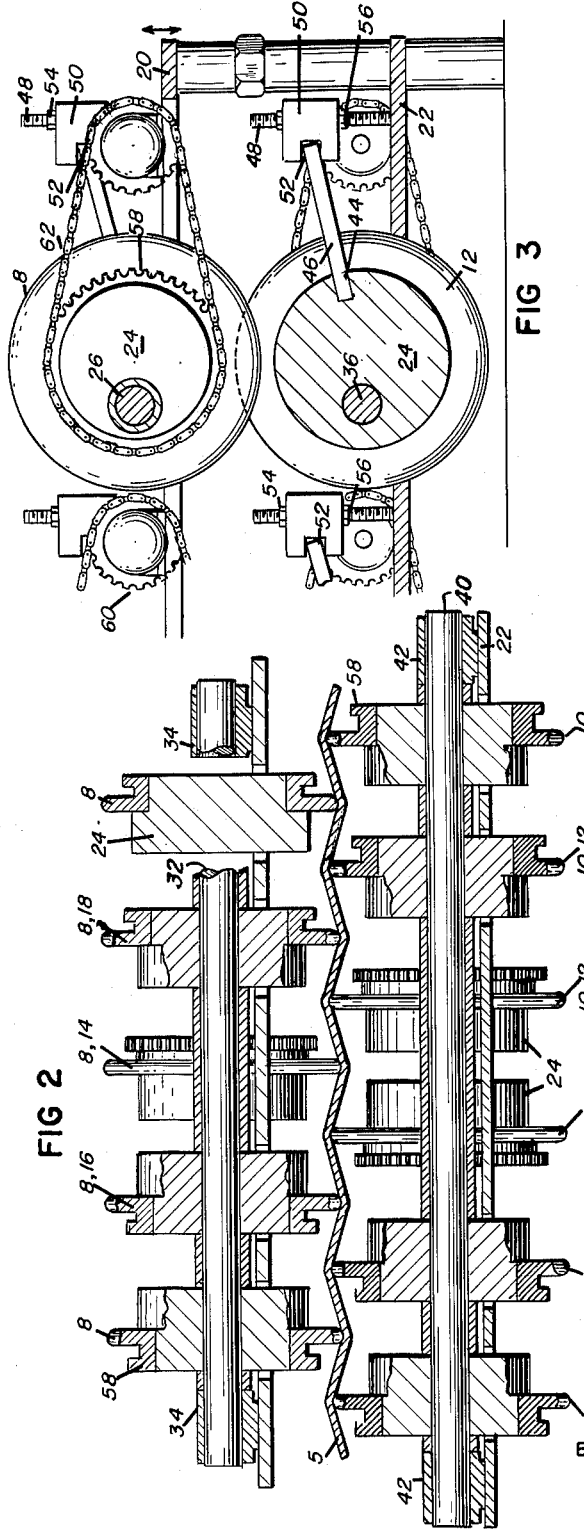
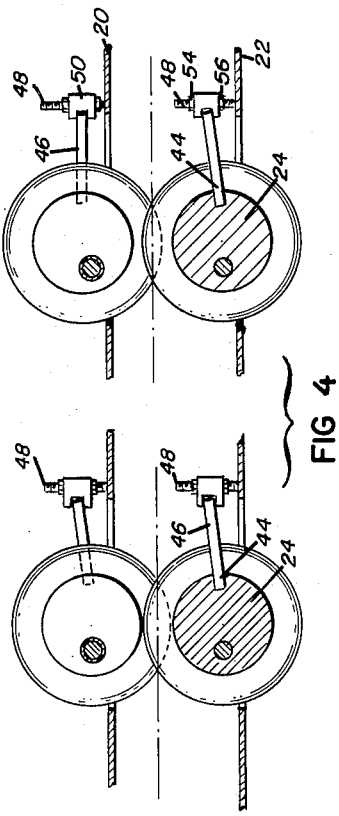
THOMAS BRUCE CAMPBELL
INVENTORS
BY Jacob E. Davidson
ATTORNEYS

United States Patent Office 3,256,566
Patented June 21, 1966

3,256,566
CORRUGATING APPARATUS
Thomas Bruce Campbell, 235 High St.,
New Wilmington, Pa.
Filed Apr. 3, 1964, Ser. No. 357,234
5 Claims. (Cl. 18—19)

This invention relates to machines for, and methods of, corrugating sheet material, and while particularly applicable to metal sheet stock, the invention is applicable to the corrugation of plastics, paper, cardboard, fiber board and the like.

Corrugating machines are known in which a plurality of adjacent corrugations are formed simultaneously. Machines of this general type comprise cooperating forming rolls mounted across the width of the machine and form the corrugations as the material is passed between them. Due to the reduction in width of the material as the corrugations are formed, with such machines, there is a consequent and inherent lateral stressing and stretching of the stock which weakens the same. Machines of this type are therefore limited not only in quality of production but also in the number of corrugations and depth of the corrugations which can be formed since an increase in the number and/or depth of corrugations increases the risk of rupture, tearing, severe weakening, and overstressing of the material. Another limitation on the prior types of machines is the pattern of corrugations that can be formed therewith without changing corrugating rolls. For example, the spacing and depth of corrugations is fixed in such machines with a given roller set and can be changed only by changing the rolls. Moreover, with wear of the rolls, the same must be replaced in order to maintain uniformity in production.

A primary object of the present invention is to provide apparatus for, and methods of, corrugating which are not subject to the aforesaid disadvantages. More particularly, it is an object of this invention to provide a method of corrugating, and apparatus for carrying out such method, which method and apparatus can be used to corrugate sheet of unlimited width with deep corrugations of selected shapes. Even further, another object of this invention is to provide such a method and apparatus which permits production of corrugations of different patterns and depths without changing corrugating rolls in the apparatus.

Additionally, it is an object hereof to provide such a corrugating machine which includes adjustment means for compensating for the wear of corrugating rolls used therein.

Equally as important, if not more important than the preceding objects, but consistent therewith, it is a further object of the invention to provide a method and apparatus for corrugating various materials, which method and apparatus avoid the risks of rupture, tearing, weakening, and undue stressing of the material, while still permitting a continuous corrugating operation.

Consistent with both the method and apparatus aspects of the invention, a corrugating machine is provided which forms a single corrugation in a flat sheet of material and then forms a pair of corrugations, one on each side of the single corrugation. Additional pairs of corrugations are formed, one pair at a time, with each corrugation being formed between the last formed corrugation and the edge of the sheet until the required number is produced. The edges of the sheet of material are unconfined and as each corrugation is formed the edges of the sheet are allowed to freely move toward the corrugation being formed. The narrowing of the sheet is therefore produced without stressing. The rolls for producing the corrugations are each individually mounted and individually adjustable to permit selective control of the depth of corrugation, as well as controlled adjustment for wear.

The invention will be better understood, and objects other than those set forth above will become apparent when consideration is given to the following detailed description. Such description makes reference to the annexed drawings presenting a preferred and illustrative embodiment of the invention. In the drawings:

FIGURE 2 is a transverse sectional view of the apparatus shown in FIGURE 1, FIGURE 2 having been taken on the line 2—2 of FIGURE 1;

FIGURE 3 is a partial longitudinal sectional view taken along the line 3—3 of FIGURE 1; and FIGURE 4 is a fragmental detailed view illustrating the arrangement of rolls and adjusting means in selectively alternate positions.

Figure 1:
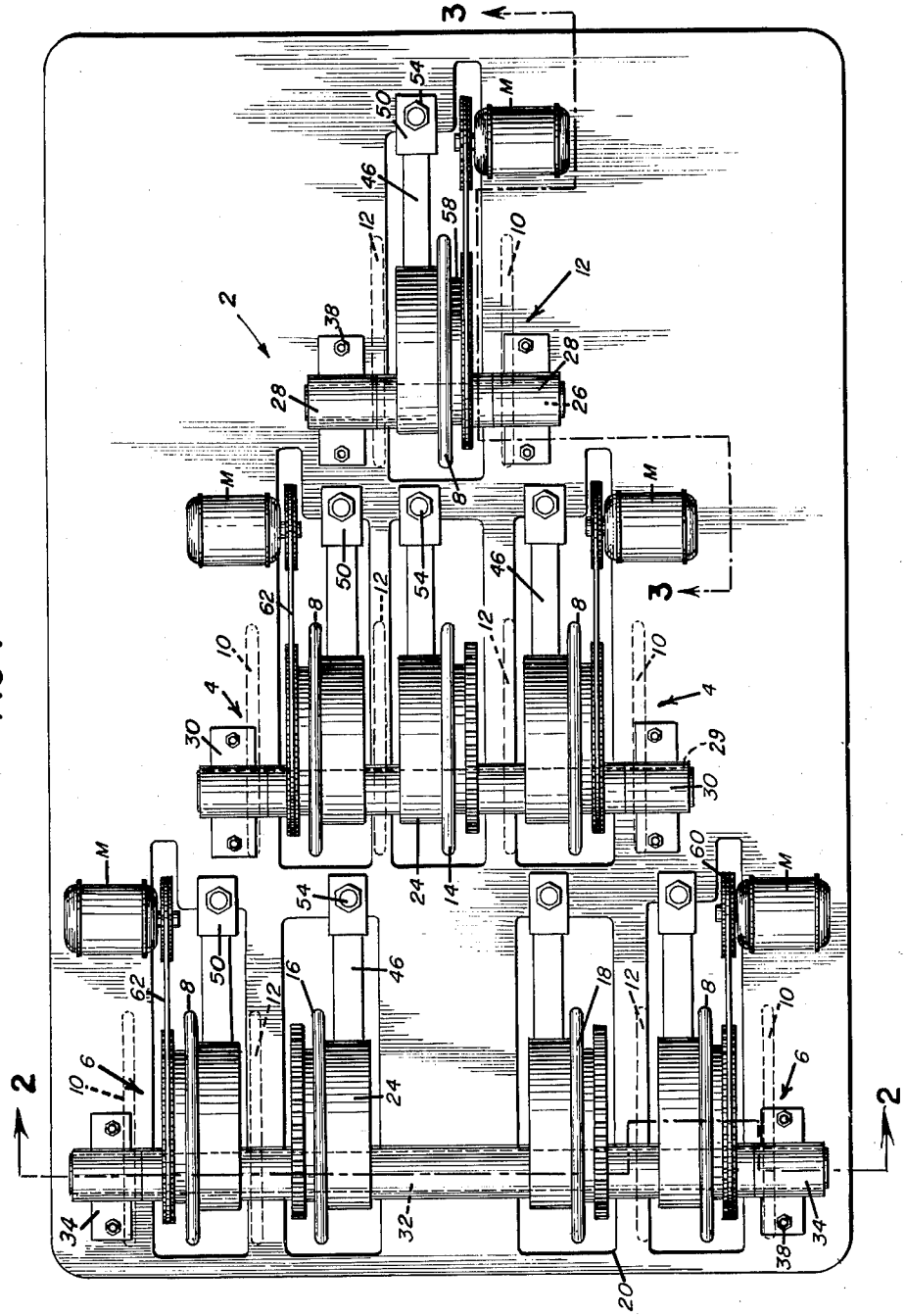
FIGURE 1 is a plan view of a corrugating machine constructed in accordance with the invention.

In accordance with the method of the present invention, a piece of sheet stock or a flat sheet of material is corrugated by first forming a single corrugation in the sheet, and by then in successive steps, forming single corrugations between the last formed corrugation and the edge of the sheet until the desired number of corrugations are provided in the sheets or sheet stock. Consistent with such operational steps, the apparatus provided hereby, as shown in the drawings, comprises a plurality of sets of corrugating rolls 2, 4, 6. Each set comprises an upper roll 8 and a pair of lower rolls 10, 12. The upper rolls are independently driven by separate electric motors M and the rolls 10 of the lower pair are also independently driven by electric motors (not shown). However, it should here be understood that it is within the scope of the invention to drive the rolls from a single motor and appropriate gearing.

Regardless of the drive arrangement, mounted between the upper rolls 8 of the sets 4 is an idle roll 14 and mounted between the upper rolls 8 of the sets 6 are idle rolls 16, 18. The idle roll 14 is aligned with roll 8 of set 2 and the idle rolls 16, 18 are aligned with rolls 8 of sets 4. The lower rolls 10, 12 of set 2 are aligned with lower rolls 12 of sets 4 and the lower rolls 10 of sets 4 are aligned with lower rolls 12 of sets 6.

The upper rolls are adjustably mounted on an upper platform 20 of the machine frame and the lower rolls are adjustably mounted on a lower platform 22 of the frame. Each roll is rotatably mounted on a bushing 24, which in turn is eccentrically mounted on a shaft supported in a block. The upper bushing 24 of set 2 is eccentrically mounted on a shaft 26 fixed in blocks 28, and the blocks are secured to platform 20. The upper bushings 24 of set 4 are eccentrically mounted on a shaft 29 fixed in blocks 30 and upper bushings 24 of set 6 are eccentrically mounted on a shaft 32 fixed in blocks 34. The blocks 28, 30, 34 are secured to platform 20 in any suitable manner, as by bolts 38. The lower bushings 24 are secured to the lower platform 22 in the same manner. The lower bushings 24 of sets 2, 4, 6 are respectively eccentrically mounted on shafts 36, 39 40 and the shafts are fixed in blocks (only one pair being shown at 42).

Each bushing 24 is provided with a slot 44, and such slot fixedly receives therein an arm 46. A threaded shaft 48 is fixedly mounted on the platform adjacent the end of each arm, and has mounted for sliding movement thereon, a saddle member 50 with a slot 52 receiving the arm. Nuts 54, 56 are threaded on shaft 48 and are adjusted to move the saddle member along the shaft and secure it in the selected position.

Sprockets 58 are drivingly secured to rolls 8 and 10. Also sprockets 60 are mounted on the shafts on motors M, and a sprocket chain 62 is trained over the sprockets whereby to drive the rolls.

In operation, the rolls are adjusted to the selected amount of overlap by threading nuts 54, 56 along shaft 48 to move the saddle member 50 up or down as required for the particular corrugating operation. Movement of the saddle member raises or lowers arm 46 to in turn pivot the bushings 24 about the shafts on which they are mounted to thereby vertically adjust the rolls. Since the rolls are each independently adjustable, the depth of each corrugation can be independently selected to provide for a pattern of corrugations which can be selected at will. The depth of each corrugation can be selected to provide a range of depths and patterns without changing the rolls.

After the rolls are adjusted and locked in position by nuts 54, 56 the machine is ready for operation. The sheet material 5 to be corrugated is fed to the first set of rolls 2 to provide the first corrugation which can be formed centrally of the sheet. Since the sheet is unconfined laterally of the area of the first corrugation, the material is subject to the minimum stressing forces. The second set of rolls 4 produces a corrugation on each side of the central corrugation. Again the sheet is free to reduce in width laterally of the area of these corrugations since the lateral edges are unconfined. The third set of rolls 6 produces a corrugation adjacent each of the corrugations produced by sets 4 and the sheet being unconfined laterally is free to reduce in width with a minimum of stressing of the material. Only three sets of forming rolls are shown, but it will be understand that more sets can be used.

As possibly best shown in FIGURE 1, and as should be apparent from the preceding discussion, the outer rolls of each set following the first set effectively provide the working rolls and the inside rolls effectively provide for maintenance of prior corrugations. Specifically, the rolls 16 and 18 of the rear set, as shown in FIGURE 1, are longitudinally aligned with a pair of working rolls 8 in the second set, as shown in FIGURE 1. The working rolls 8, as explained above, provide the first two corrugations following formation of the initial corrugation by the first forward and centrally located working rolls 8. The first corrugation is maintained by the roll 12 when the working rolls 8 of the second set form their corrugations. Then, the pair of corrugations formed by the second set of working rolls are maintained by the rolls 16 and 18 when the third set of working rolls 8 form additional corrugations.

Since the stress on the material is relieved by permitting the outside edges of the sheet stock to move freely laterally, it is only necessary to provide rolls to maintain the last formed outermost corrugations during the formation of a new pair of corrugations. Accordingly, a central roll 14 need not be used with the third set of working rolls 8, and instead only the rolls 16 and 18 would be required. Similarly, if the system of FIGURE 1 was expanded to form seven corrugations, for example, as opposed to five, then another set of working rolls would be provided rearwardly of the third set shown in FIGURE 1, and an additional set of maintaining rolls would be provided in longitudinal alignment with, but rearwardly of, the working rolls 8 in the third set shown.

By following the method provided hereby, and by utilizing the apparatus hereof to carry out such method, corrugating operations can be achieved easily and continuously without undue stressing of the material during the operation. Further, once the corrugations shape and depth is adjusted, the apparatus insures maintenance of such shape during the successive but continuous corrugating operations, and in the event of wear, the rolls can be adjusted so as to maintain the prior desired configuration, during operation of the apparatus. Each individual working collar can be adjusted to compensate for variations or regulations to each corrugation.

The above described freedom of lateral movement can possibly best be understood with respect to FIGURE 2.

FIGURE 2 presents a transverse sectional view of the apparatus of FIGURE 1, as the same would appear when a sheet 5 is being formed thereby. The freedom of the sheet edges to move laterally and vertically should be evident, and in turn it should be apparent that the stresses and strains are reduced to a minimum by the method and apparatus hereof.

After reading the foregoing detailed description of illustrative and preferred embodiments of the present invention, it will be appreciated that the objects set forth at the outset of the present specification have been successfully achieved.

What is claimed is:

1. A corrugating machine comprising a frame, a plurality of sets of forming rolls spaced along the frame, and means adjustably mounting each roll for independent movement in a vertical plane, said mounting means including a shaft fixed to the frame, a bushing eccentrically mounted on the shaft, means rotatably mounting the roll on the bushing, and means for pivoting the bushing about the shaft.

2. An apparatus as in claim 1, wherein each set comprises a spaced pair of lower rolls mounted on one set comprises a spaced pair of lower rolls mounted on one level of the frame and an upper roll mounted on an upper level of the frame between the lower rollers.

3. An apparatus as in claim 2 further comprising individual motor means connected to drive each upper roll and individual motor means connected to drive at least one of the lower rolls.

4. An apparatus as in claim 2 wherein the means for pivoting the bushing comprises an arm secured to the bushing at one end and means connected to the arm at the other end for moving said end in a vertical plane.

5. An apparatus as in claim 4 wherein the means for moving the arm comprises a threaded shaft, a saddle member mounted on said shaft for movement therealong, means connecting the arm to the saddle and means for fixedly securing the saddle in a selected position on the threaded shaft.

References Cited by the Examiner

UNITED STATES PATENTS

| 1,293,072 | 2/1919 | Ford | 264—286 |
| 1,444,395 | 2/1923 | Seigle | 18—19 |
| 1,497,809 | 6/1924 | Sutherland | 264—286 |
| 2,710,043 | 6/1955 | Hubmeier | 18—19 |
| 3,165,783 | 1/1965 | Martelli | 18—19 |

FOREIGN PATENTS 891,829  3/1962  Great Britain.

WILLIAM J. STEPHENSON, *Primary Examiner.*